United States Patent [19]

Achiha

[11] Patent Number: 4,688,084
[45] Date of Patent: Aug. 18, 1987

[54] MOVEMENT DETECTION CIRCUIT FOR TELEVISION SIGNALS

[75] Inventor: Masahiko Achiha, Iruma, Japan

[73] Assignee: Hitachi, Ltd., Tokyo, Japan

[21] Appl. No.: 881,401

[22] Filed: Jul. 2, 1986

[30] Foreign Application Priority Data

Jul. 12, 1985 [JP] Japan .................................. 60-152206

[51] Int. Cl.⁴ .......................................... H04N 9/78
[52] U.S. Cl. ......................................... 358/36; 358/37
[58] Field of Search ...................... 358/31, 36, 37, 166, 358/167

[56] References Cited

U.S. PATENT DOCUMENTS

| | | | |
|---|---|---|---|
| 4,242,704 | 12/1980 | Ito | 358/36 |
| 4,246,610 | 1/1981 | Takahashi | 358/36 |
| 4,389,665 | 6/1983 | Nagao | 358/31 |
| 4,498,100 | 2/1985 | Bunting | 358/31 |
| 4,571,620 | 2/1986 | Anderson | 358/37 |

*Primary Examiner*—Michael A. Masinick
*Attorney, Agent, or Firm*—Antonelli, Terry & Wands

[57] ABSTRACT

Disclosed is a picture movement detection circuit for use for processing a color television signal, that is, a circuit for detecting temporal variations in chrominance signal level of a color televison picture. A signal corresponding to the magnitude of an absolute value, an amplitude, or the like, of a difference or addition signal between frames or field of a modulated chrominance signal of a color television signal is obtained, and a low frequency component is extracted out of the thus obtained signal so that the extracted low frequency component is used as movement information of the picture.

5 Claims, 7 Drawing Figures ns,084

MOVEMENT DETECTION CIRCUIT FOR TELEVISION SIGNALS

BACKGROUND OF THE INVENTION

1. Field of the Invention

The present invention generally relates to a movement detection circuit for television signals and particularly relates to a circuit for extracting movement information of an object included in a composite color television signal in which a chrominance signal modulated by a subcarrier is superimposed on a luminance signal.

In the specification of this application, the "motion information of an object" is not for the detection of direction or distance of movement but for the detection of a temporal variation in pixel level (amplitude).

2. Description of the Prior Art

An inter-frame video coder for processing television signals by using a frame memory (or field memory), a frame-recursive noise reducer, a separation circuit for separating a luminance signal and a chrominance signal from each other, a scanning line interpolating circuit, and so on, are known as means for processing motion picture signals. In those means, how to extract motion information of an object has been a serious problem. In the case of a monochromatic television signal, motion information of an object can be extracted on the basis of the magnitude of an inter-frame difference signal calculated by using a frame memory. On the other hand, in the case of a composite color television signal in which a chrominance signal modulated with a subcarrier frequency $f_{ac}$ is superimposed on a luminance signal like an NTSC signal, the phase of the subcarrier of the frequency $f_{ac}$ modulating the chrominance signal changes in every frame so that a modulated chrominance signal may leak into the inter-frame difference signal in addition to the motion information to thereby make it impossible to obtain correct movement information.

In a conventional motion detection circuit, as described in Japanese patent unexamined publication No. 130685/83, motion information has been obtained on the basis of the magnitude of an operational signal such as an inter-frame or inter-field sum or difference of modulated chrominance signal. The above-mentioned operational signal has the subcarrier frequency $f_{ac}$ as its central frequency, so that its amplitude ripples with a frequency of $\frac{1}{2}f_{ac}$ so as to cause a dot structure of produce stationary areas in a moving area. There has been caused, therefore, such a problem that the picture quality in the moving area rather deteriorates in the case where such an operational signal is utilized as movement information.

SUMMARY OF THE INVENTION

It is a main object of the present invention to realize means for detecting movement information in a chrominance signal in a composite color television signal.

It is another object of the present invention to realize means for detecting movement information correctly in spite of existence of variations in amplitude of a chrominance signal due to subcarrier.

To achieve the above objects, according to the present invention, a difference signal representing a difference between a composite color television signal including a modulated chrominance signal and a signal obtained by delaying the above-mentioned composite color television signal by a period about integer times as much as a field period of the composite color television signal, that is, an inter-frame difference signal or an inter-field difference signal, is obtained and a low frequency component is extracted out of the thus obtained inter-frame or inter-field difference signal to utilize the low frequency component as movement information of a picture. Generally, when a picture moves, the level or amplitude of the chrominance signal of the picture varies. According to the present invention, therefore, neither the direction nor the distance of movement of a picture is not detected as movement information of a picture but variations in level or amplitude of a chrominance signal are utilized as the movement information.

According to the present invention, such erroneous movement information that causes a dot structure of stationary areas in a moving area due to a subcarrier as described above can be prevented from occurring, because a low frequency component extracted out of a chrominance signal after a modulated chrominance signal has been separated is used as the movement information.

The above-mentioned and other features and objects of the present invention will become more apparent by reference to the following description taken in conjunction with the accompanying drawings.

DESCRIPTION OF THE PREFERRED EMBODIMENTS

Figure 1:
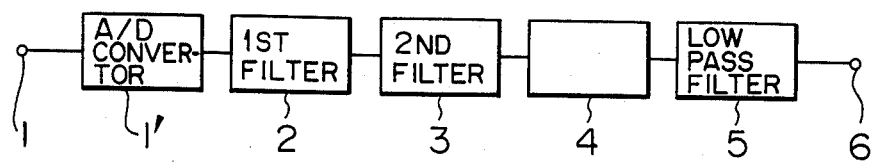
FIG. 1 is a diagram showing the arrangement of a basic embodiment of the movement detection circuit for television signals according to the present invention.

FIG. 1 is a block diagram showing the arrangement of a basic embodiment of the movement detection circuit for color television signals according to the present invention.

Figure 5:
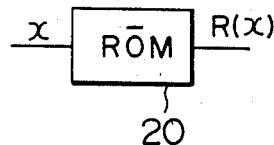
FIG. 5 is a circuit diagram of an embodiment of the movement coefficient converter 4 in FIG. 1.

A video signal of a color television signal, that is, a composite color television signal in which a luminance signal and a modulated chrominance signal are superimposed, is applied to an input terminal 1 and digitized or converted into a digital signal by an analog-to-digital (A/D) converter 1'. A first filter 2 receives the digital signal from the A/D converter 1' to detect temporal variations in picture signals. The first filter 2 may be constituted by such a simple circuit as shown in either one of FIG. 2, and FIGS. 3A through 3C. The first filter 2 is arranged to obtain a signal level difference between pixels separated from each other by a temporal interval integer times as long as a field period in the same position or very close positions on a television picture scene. The output of the first filter 2 includes not only movement information of a modulated chrominance signal but movement information of a luminance signal. In order to separate the movement information of a luminance signal from the movement information of a modulated chrominance signal, the output of the first filter 2 is applied to a second filter 3 which allows only signals in a modulated chrominance signal band to pass therethrough. The respective positions of the first and second filters 2 and 3 in the circuit may be reversed. A movement coefficient converter 4 receives a signal including the movement information of a modulated chrominance signal obtained through the first and second filters 2 and 3. The movement coefficient converter 4 has a non-linear characteristic, such as an absolute value characteristic, a square characteristic, a multiplication characteristic, and so on, for converting the received signal into a signal corresponding to the magnitude of movement. FIG. 5 shows an embodiment of the movement coefficient converter 4. The output signal of the movement coefficient converter 4 is applied to a low-pass filter 6 from which a signal corresponding to the movement information is derived.

Figure 2:
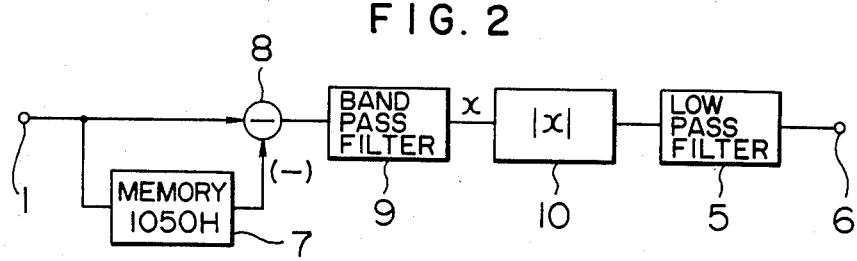
FIG. 2 is a diagram showing the arrangement of another embodiment of the movement detection circuit for television signals according to the present invention.

FIG. 2 is a block diagram showing the arrangement of another embodiment of the movement detection circuit for color television signals according to the present invention. In this embodiment, the movement information is extracted from an inter-biframe difference signal. In FIG. 2, a composite color television signal applied to an input terminal 1 is delayed in a memory 7 having a capacity of a period two times as long as the frame period (1050 H: H being one horizontal scanning period) and then an inter-biframe difference signal is calculated in the subtractor 8.

The polarity of a modulated chrominance signal is made opposite every horizontal period or every scanning period. Accordingly, a modulated chrominance signal and another modulated chrominance signal obtained by delaying the first-mentioned signal by a period two times as long as the frame period are in phase with each other, and a difference therebetween becomes zero in the case of a still picture while forms a significant signal in the case of a moving picture. In the latter case therefore, if a component having the subcarrier frequency $f_{ac}$ as its central frequency is extracted out of the above-mentioned difference signal or significant signal through a band-pass filter 9, it is possible to obtain, as an output of the band-pass filter 9, a signal including movement information of the chrominance signal. Conventionally, the existence of movement in a picture has been judged on the basis of the magnitude of the thus obtained output signal, however, there has been a problem as described above. In this embodiment, therefore, an absolute value of the output signal of the band-pass filter 9 is obtained, for example, by an absolute circuit 10 which is a specific example of the movement coefficient circuit 4 of the first embodiment of FIG. 1, and then a low frequency component of the output of the absolute circuit 10 is extracted through a low-pass filter 5. In this embodiment of FIG. 2, the combination of the biframe memory 7 and the subtractor 8 correspond to the first filter 2 of the basic embodiment of FIG. 1, and the band-pass filter 9 corresponds to the second filter 3 of the same.

Figure 3A:
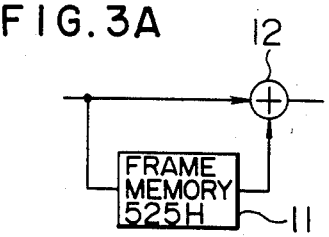
FIGS. 3A, 3B and 3C are circuit diagrams showing examples of the first filter in FIG. 1.
Figure 3B:
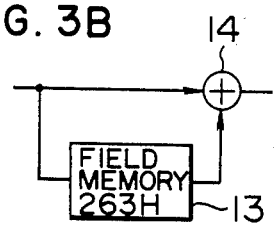
Figure 3C:
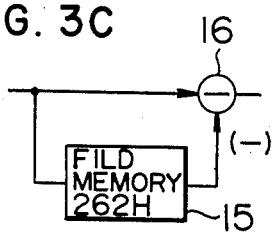

FIGS. 3A, 3B, and 3C show three specific examples of the first filter 2 of FIG. 1. In FIG. 3A, the output of the D/A converter 1' of FIG. 1 is delayed by a frame memory 11 having a capacity of 525 H and the non-delayed output of the D/A converter 1' and the delayed output of the frame memory 11 are added to each other in an adder 12. The output of the adder 12 becomes zero when the modulated chrominance signal relates to a still picture while becomes a significant signal in the case of a moving picture. A known movement information extracting circuit in which the polarity of a chrominance signal one frame before is inverted by a chrominance signal polarity inversion circuit so as to obtain an inter-frame difference signal to thereby extracting the movement information is equivalent to the circuit of FIG. 3A. In FIG. 3B, a field memory 13 having a capacity of 263 H is used to extract movement information. Because the polarity of the modulated chrominance signal is reversely inverted, movement information can be obtained from the output of an adder 14 in the same manner as the case of FIG. 3A. In FIG. 3C, a field memory 15 having a capacity of 262 H is used so that movement information of a chrominance signal is obtained on the basis of a difference signal between an input and an output of the field memory 15 produced from a subtractor 16.

Figure 4:
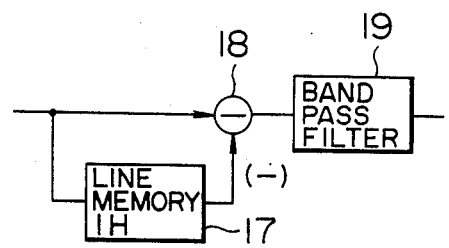
FIG. 4 is a circuit diagram of the second filter in FIG. 2.

FIG. 4 shows another example of the second filter for extracting a modulated chrominance signal out of the signal extracted through the first filter 2. In FIG. 4, a line memory having a capacity of 1 H is used to obtain an inter-line difference and a component having the subcarrier frequency $f_{ac}$ as its central frequency is extracted out of the inter-line difference signal through a band-pass filter 19. The extraction of modulated chrominance signal can be more accurately in this case than the case where only the band-pass filter 9 is singly used as shown in FIG. 2.

FIG. 5 shows another embodiment of the movement coefficient converter 4. In this case, in response to an input signal x, an output signal k(x) is obtained through a read only memory (ROM) 20. In accordance with the contents of the ROM 20, it is possible to obtain a desired conversion characteristic, for example, such as an absolute value characteristic, a square characteristic, a demodulation characteristic from a modulated chrominance signal to a chrominance signal, a quantization characteristic, or the like.

Although the above embodiments have been described as to a composite color television signal of the NTSC system, it is apparent that the present invention is applicable to a composite color television signal of any system, for example, of the PAL system, other than the NTSC system.

According to the present invention, it is possible to correctly obtain movement information of a modulated chrominance signal of a composite color television signal so as to solve the prior art problem in which a dot structure of stationary picture areas are formed in a moving picture area to result in deterioration in picture quality, thereby realizing an optimum television signal processing circuit by utilizing the thus obtained correct movement information to provide a remarkable effect in making the performance of the circuit high.

I claim:

1. A movement detection circuit for extracting movement information of an object included in a composite color television signal in which a chrominance signal modulated with a subcarrier frequency is superimposed on a luminance signal, said circuit comprising:
   a first filter for detecting temporal variations in said composite color television signal;
   a second filter for extracting a signal having the subcarrier frequency as its center frequency out of an output signal of said first filter;
   a converter having a non-linear characteristic for converting an output of said second filter into a coefficient representing the movement information; and
   a low-pass filter for passing a low frequency component of an output of said converter.

2. A movement detection circuit according to claim 1, in which an input to said first filter is a digital signal of the composite color television signal.

3. A movement detection circuit according to claim 2, in which said converter is arranged to obtain an absolute value of an input signal applied thereto.

4. A movement detection circuit according to claim 2, in which said composite color television signal is an NTSC color television signal, and in which said first filter is constituted by a memory for delaying an input thereto by a period of 1050 H, 525 H, 263 H, or 262 H (H being one horizontal period) and an operation circuit for obtaining a difference or sum between an input and an output of said memory.

5. A movement detection circuit according to claim 2, in which said second filter is constituted by a line memory for delaying an input signal thereto by a period of 1 H (H being one horizontal period) and a band-pass filter for extracting a component in the vicinity of a component of said subcarrier frequency from a difference signal between an input and an output signal of said line memory.

* * * * *